United States Patent
Ross

(10) Patent No.: US 6,748,941 B1
(45) Date of Patent: Jun. 15, 2004

(54) FOAM FIREPLACE CONSTRUCTION

(76) Inventor: Stephen Ross, 4750 E. Wesley Dr., Anaheim, CA (US) 92807

( * ) Notice: Subject to any disclaimer, the term of this patent is extended or adjusted under 35 U.S.C. 154(b) by 0 days.

(21) Appl. No.: 10/358,534

(22) Filed: Feb. 5, 2003

Related U.S. Application Data

(63) Continuation-in-part of application No. 10/228,325, filed on Aug. 27, 2002.

(51) Int. Cl.$^7$ .................................................. F24B 1/18
(52) U.S. Cl. .......................... 126/500; 126/144; 52/218; 52/219; 52/309.7; 52/745.21
(58) Field of Search ................................ 126/500, 512, 126/8, 144, 151, 147, 85 B, 307 R, 312; 52/218, 219, 503, 504, 505, 589.1, 592.1, 578, 587.1, 586.2, 309.7, 745.21

(56) References Cited

U.S. PATENT DOCUMENTS

| | | | |
|---|---|---|---|
| 2,101,378 A | 12/1937 | Wiskoff | 217/7 |
| 2,108,373 A | 2/1938 | Greulich | 189/37 |
| 3,043,408 A | 7/1962 | Attwood | 189/34 |
| 3,483,665 A | 12/1969 | Miller | 52/461 |
| 3,517,474 A | 6/1970 | Lanternier | 52/732 |
| 3,538,909 A | 11/1970 | Migues | 126/120 |
| 3,601,117 A | 8/1971 | Carson | 126/121 |
| 3,606,718 A | 9/1971 | Curran | 52/542 |
| 3,706,169 A | 12/1972 | Rensch | 52/263 |
| 4,016,859 A * | 4/1977 | Landowski | 126/518 |
| 4,098,257 A | 7/1978 | Stanko | 126/121 |
| 4,566,241 A | 1/1986 | Schneller | 52/481 |
| 4,686,807 A * | 8/1987 | Newsome | 52/314 |
| 4,737,060 A | 4/1988 | Birckhead | 411/468 |
| 5,022,205 A | 6/1991 | Ford | 52/309.16 |
| 5,186,161 A * | 2/1993 | Shumock | 126/500 |
| 5,199,415 A | 4/1993 | Johnson, Jr. | 126/500 |
| 5,287,671 A | 2/1994 | Ueki | 52/588 |
| 5,505,191 A | 4/1996 | Brown | 126/500 |
| 5,661,929 A | 9/1997 | Ross | |
| 5,723,225 A | 3/1998 | Yasui et al. | 428/593 |
| 5,765,318 A | 6/1998 | Michelsen | 52/98 |
| 5,893,248 A | 4/1999 | Beliveau | 52/309.7 |
| 5,996,575 A | 12/1999 | Shimek | 126/512 |
| 6,158,190 A | 12/2000 | Seng | 52/731.5 |
| 6,203,232 B1 | 3/2001 | Ward | 403/14 |
| 6,272,796 B1 | 8/2001 | Metzler | 52/93.1 |
| 6,315,026 B1 | 11/2001 | Ross | |
| 6,350,498 B1 * | 2/2002 | Hess et al. | 428/15 |
| 6,354,288 B1 | 3/2002 | McDonald | 126/519 |
| 6,387,469 B1 | 5/2002 | Ristow et al. | 428/116 |
| 2003/0203703 A1 * | 10/2003 | DeSalvo et al. | 446/106 |
| 2004/0016195 A1 * | 1/2004 | Archuleta | 52/506.01 |

* cited by examiner

Primary Examiner—James C. Yeung
(74) Attorney, Agent, or Firm—Goldstein Law Office, P.C.

(57) ABSTRACT

A fireplace system, constructed of modules including a firebox, a chimney housing, and a base, each module substantially a block of foam. The firebox has a fire cavity which is lined with fire resistant board to protect the foam from direct exposure to heat. The chimney housing has a central bore and a flue extending concentrically therethrough which has an inner tube in communication with the fire cavity and a concentric and spaced outer tube which is attached to the central bore to impede the flow of heat from the inner tube to the foam chimney housing. The chimney housing, base, and firebox are selectively attached together using connector sets which each include a pair of connection devices, one of which is partially submerged and anchored within the foam of each of the modules to be joined. The modules are joined by mating the connection devices of each connection set.

19 Claims, 10 Drawing Sheets

FOAM FIREPLACE CONSTRUCTION

CROSS REFERENCES AND RELATED SUBJECT MATTER

This application is a continuation-in-part of U.S. patent application Ser. No. 10/228,325, filed in the United States Patent Office on Aug. 27, 2002.

BACKGROUND OF THE INVENTION

The invention relates to a foam fireplace construction. More particularly, the invention relates to a system which allows a fireplace to be conveniently and safely constructed using foam components, wherein such components may be provided in multiple modules which are subsequently assembled 'on-site'.

Wood burning fireplaces are generally constructed using bricks, stone, and mortar. These materials are used because of their non-flammability. Unfortunately, these materials are expensive and require skilled artisans to spend considerable time working at the site of installation to create the fireplace.

Although foam, especially polystyrene and polyethylene, holds great promise as a building material, its limitation lies in the difficulty of interfacing with other building materials. For example, common fasteners such as screws and nails cannot be used to attach other building materials to foam. They 'pull out' from the foam just as easily as they penetrate the foam.

The most common way in which foam is attached to other surfaces is with adhesives. The adhesives, however, only adhere to the outer surface of the foam. Accordingly, the strength of the joint relies upon the internal structural integrity of the foam. Such a joint may present reasonable resistance to shearing forces, but cannot resist much torsional loading against the joint. Such forces will have a tendency to 'peel away' the foam at the joint. In addition, even in a suitable installation, adhesives have a tendency to weaken with age.

Foam has a further limitation in the context of fireplaces: it is not suited to being subject to an open flame or intense, concentrated heat. Upon exposure to the same, foam will melt, deform, and possibly burn. Ironically, foam is an excellent thermal insulator. Accordingly, the key to the effective use of foam in a setting which would otherwise subject the foam to intense heat requires a solution to the problem of interfacing the foam with fire resistant building products.

What is needed to allow a fireplace to be constructed largely using foam components is both a reliable system for protecting the foam with fireproof or fire resistant materials and a system for securely joining foam components or modules with other foam components or modules.

My prior U.S Pat. No. 5,661,929 discloses a system which allows a building material to be anchored to foam by inserting a metal channel into the foam, and then anchoring the building material to the metal channel using ordinary fastening devices, such as screws or nails. This system allows a variety of other building materials to be fastened to the foam using screws or nails, by fastening to the metal channel therein. This system provides a basis for the present invention's attachment of fireproof board to the foam, and is incorporated herein by reference.

The attachment of foam blocks, components, or modules is not the primary focus of the present application. The present discussion, however, includes a detailed description of a system for the interconnection of the foam blocks, components, and modules of the present invention.

SUMMARY OF THE INVENTION

It is an object of the invention to produce a fireplace which is safe while being largely constructed from foam components. Accordingly the fireplace includes a foam firebox which is lined with fireproof or fire resistant boards which are anchored to the firebox to protect the same. Further, a double-walled flue extends through the chimney housing, having an inner tube and an outer tube. The outer tube is anchored to the foam. Air spaces between the outer and inner tubes, and well as between the outer tube and foam sufficiently insulate the foam chimney housing from hot gases escaping from the firebox through the flue.

It is another object of the invention to provide a fireplace which includes a base, a firebox, and a chimney housing— which are all constructed largely of foam, are finished in an aesthetically pleasing manner under controlled manufacturing conditions, and are subsequently interconnected at the installation site. Accordingly, the base, firebox, and chimney housing have connector sets which interface to create a simple and permanent interconnection attachment system. Accordingly, the system employs mateable connection devices, which are partially submerged within the foam shapes and are subsequently mated to attach the foam shapes.

It is a further object of the invention to provide an attachment system that has superior strength for ensuring a permanent connection between the base, firebox, and chimney housing components. Accordingly, each connection device has a transversely extending flange, which significantly anchors the connection device within the foam and resists pulling out of foam and detaching the components.

It is a still further object of the invention to provide superior tensile strength at the joint between the foam components which resists detachment of the connection devices. Accordingly, by at least one embodiment, one of the connection devices has a male component which forms a permanent part thereof and which selectively secures directly in the open end of a female connection device, providing a direct attachment between the connection devices.

It is a still further object of the invention to provide superior anchoring within the foam for the critical attachment of the chimney housing and firebox. Accordingly, by one embodiment of the connector set, the transverse portion of one of the connection devices has a complex shape, such as a 'dutch hat' shape, which increases the surface area of the foam against which the connection device is anchored and distributes tensile forces in several directions to prevent the chimney housing and firebox from detaching.

It is yet a further object of the invention to provide a system which has superior strength, yet is inexpensively manufactured. Accordingly, the foam components are inexpensive, and are able to be assembled in accordance with the present invention such that they have superior structural integrity.

The invention is a fireplace construction which includes a base, a firebox, and a chimney housing which are substantially constructed of foam. The firebox is lined with fire resistant boards by anchoring the boards to an insert extending through the foam. The chimney housing includes a double walled flue which has an inner tube for venting hot gases from the firebox, an outer tube which anchors to the foam chimney housing and creates an air space between the inner tube and outer tube to protect the chimney housing from the hot gases escaping through the inner tube. The firebox, base, and chimney housing are attachable upon installation by connector sets which include connection devices which extend within the foam of the firebox, base, and chimney housing. The firebox, base, and chimney housing are mated by attaching the connection devices embedded therein to each other.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
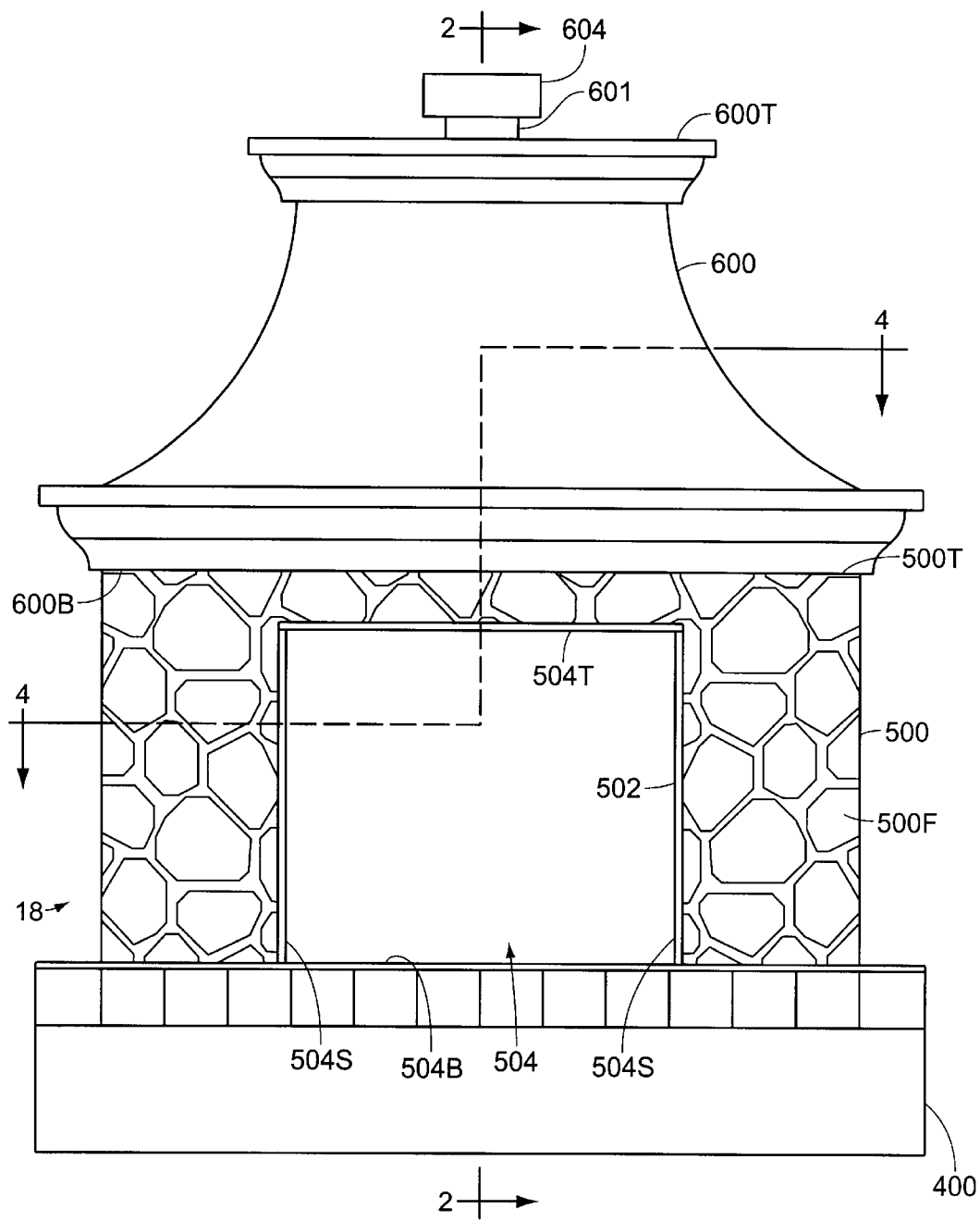
FIG. 1 is a front elevational view of the present invention, per se.

In general, the invention relates a fireplace which is constructed from several foam modules 300. In particular, the fireplace has a base 400, a firebox 500, and a chimney housing 600 which are each largely constructed, or cast from foam. These foam modules are easily connected with connector sets 20, without tools, such that once connected they can remain permanently attached to each other with superior structural integrity. The fireplace modules 300, the connector sets 20, and the interconnection of the fireplace modules 300 with the connector sets 20 will be described in detail hereinbelow.

FIG. 1 illustrates a fireplace 18, and shows a completed installation wherein the modules 300 are assembled together. In particular, the firebox 500 is mounted atop the base 400, and the chimney housing 600 is mounted atop the firebox.

The firebox 500 has a top 500T, a bottom 500B (seen in FIG. 2), and a front 500F which defines a mantle opening 502. The mantle opening 502 reveals a fire cavity 504 within which burning of wood, gas, or other fuel primarily occurs. The mantle opening 502 is either truly open, permanently transversed by a glass panel, or has a selectively openable glass panel or screen. However, in use, a fire burning within the fire cavity is seen through the mantle opening 502.

Figure 2:
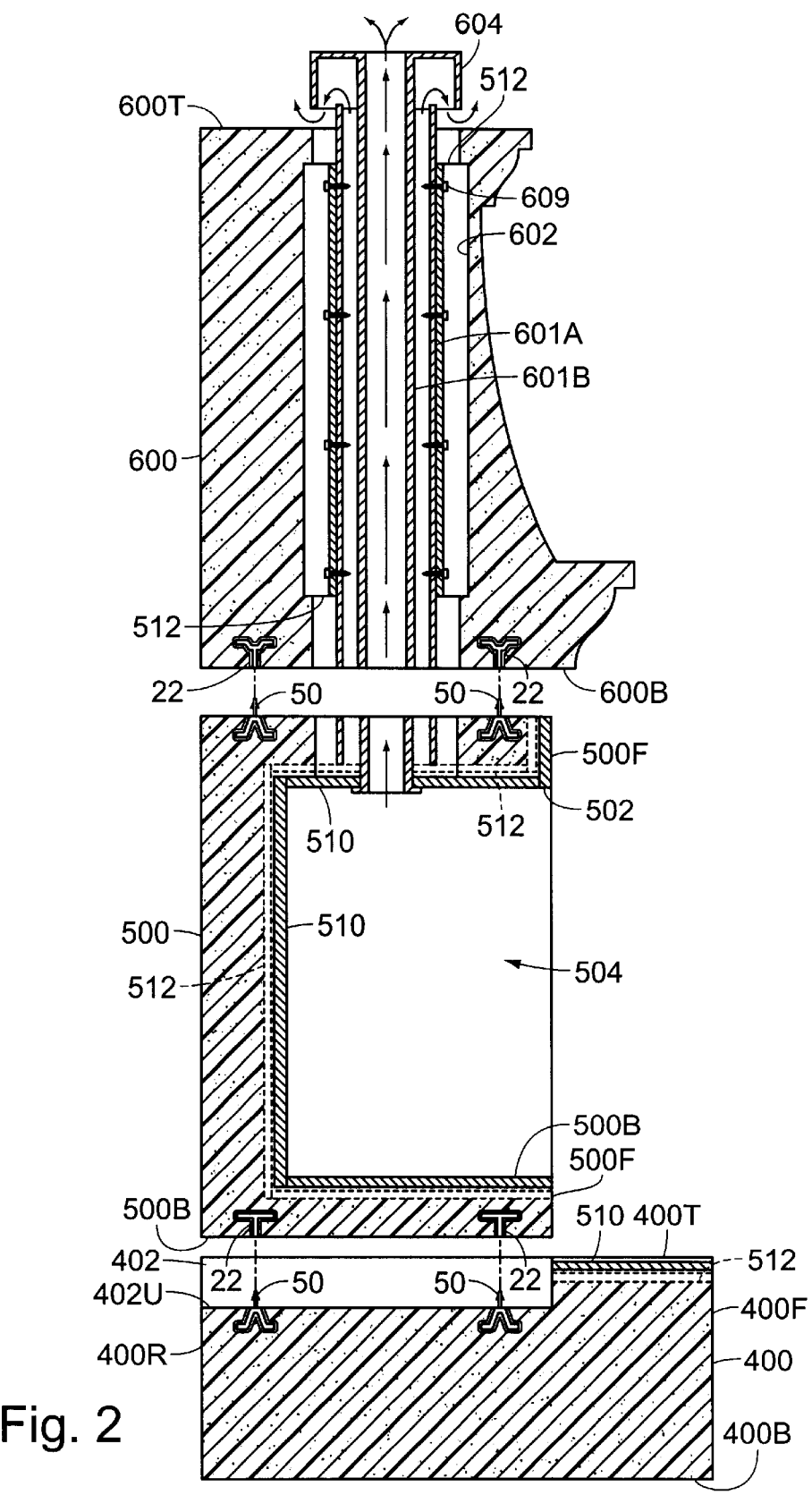
FIG. 2 is a cross sectional view, taken generally in the area of line 2—2 in FIG. 1, illustrating internal details of the chimney housing, firebox, and base, as well of the interconnection of the same.
Figure 4:
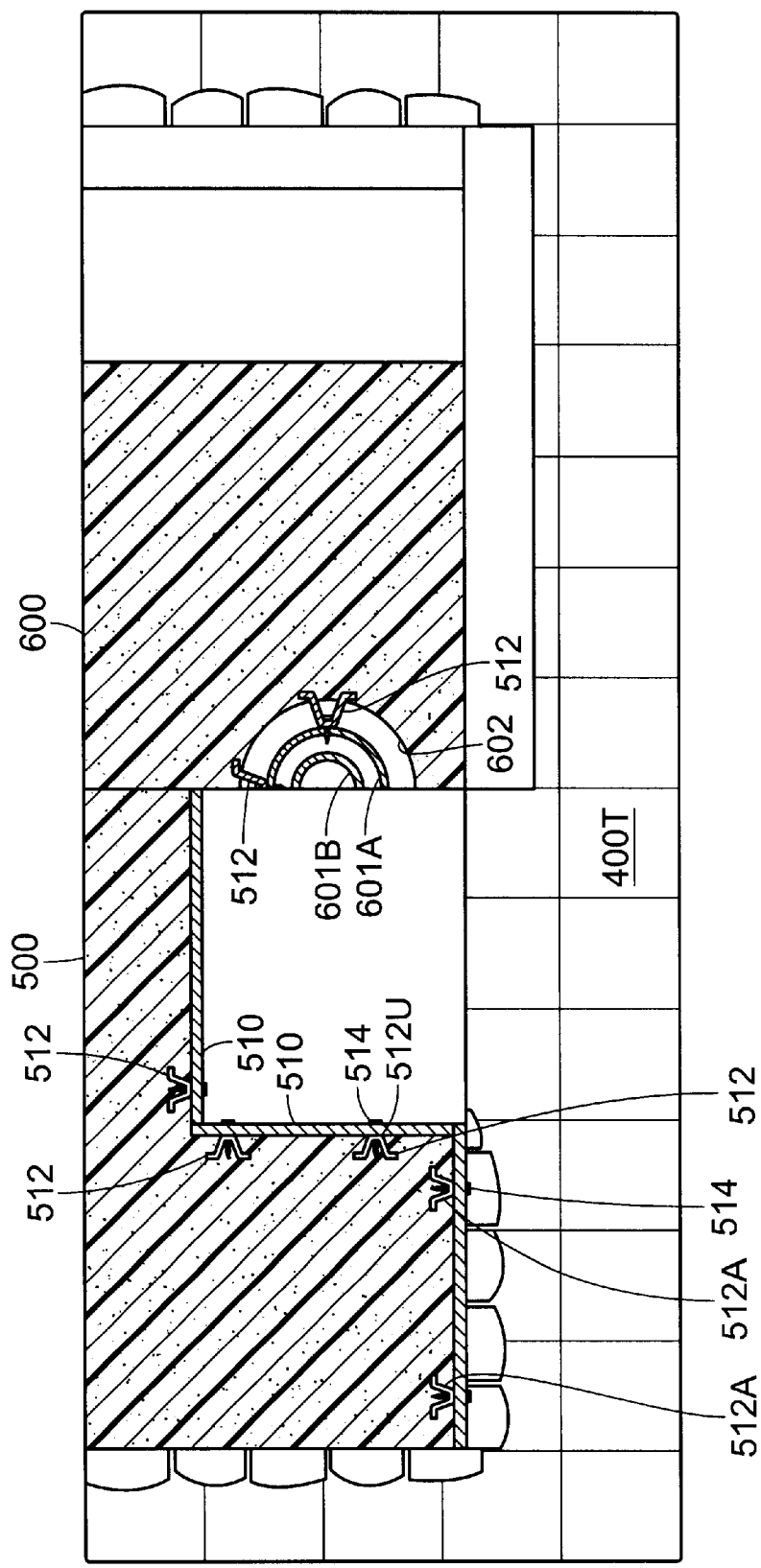
FIG. 4 is an offset sectional view, taken generally along offset cutting plane line 4—4, to illustrate details of both the anchoring of the double walled flue within the chimney housing and the fireproof board to the firebox.

As seen in FIG. 1, FIG. 2 and FIG. 4, the fire cavity 504 is a void which is suitable for containing a fire, and is generally the shape of a rectangular prism, defined by five sides and the mantle opening 502, namely: substantially parallel and horizontal fire cavity top 504T and fire cavity bottom 504B; a pair of parallel fire cavity lateral sides 504S extending vertically between the fire cavity top 504T and fire cavity bottom 504B; and a fire cavity rear extending vertically between the fire cavity top 504T and fire cavity bottom 504B and transversing the fire cavity fully between the fire cavity sides 504S. Apparently then, it is the general shape of the fire cavity which gives the firebox 500 its logical name. The firebox may also be formed in other shapes, such as a rearwardly concave firebox wherein the lateral side walls remain substantially vertical but are continuously curved between opposite vertical edges of the mantle opening 502.

As seen in FIG. 2 and FIG. 4, the firebox 500 is substantially a solid block of foam, which has a cutout at the front 50OF which defines the fire cavity 504, such that the fire cavity 504 is surrounded by foam—except at the mantle opening 502. As previously stated, foam is an excellent insulator, yet is vulnerable to the direct application of concentrated heat. Accordingly, the firebox is lined on all sides with fire resistant boards 510. Each side as recited has a foam surface which is covered and protected by the fire resistant boards 510 such that there are substantially no exposed foam surfaces within the fire cavity. Such fire resistant boards 510 are made of a material which does not burn, and has a high insulative value, such as commercially available WONDERBOARD.

The present invention overcomes the difficulty of attaching the fire resistant boards 510 to the foam by inserting elongated metal inserts 512 submerged within the foam, parallel to and adjacent to each of the sides of the fire cavity 504, and securing the fire resistant boards 510 directly to the inserts 512 using fasteners 514, which can be nails, screws or the like. The metal inserts extend within channels which are pre-cut into the foam to closely accommodate the substantially uniform cross sectional shape of the metal inserts. Where appropriate, the metal inserts 512 are illustrated in hidden lines in FIGS. 2 and 3. The metal inserts 512 each have an upper surface 512U which extends substantially parallel to foam surface at the sides of the cavity, and is submerged immediately below said foam surface or is actually exposed at said foam surface. The metal inserts 512 also have a tapered anchoring portion 512A which is attached to the upper surface 512U, and generally extends away from the foam surface and flares outward so as to anchor the metal inserts 512 within the foam in a manner which contacts maximal surface area of the foam to provide a secure joint between the fire resistant boards 510 and the foam surrounding the fire cavity. Additional context for the indirect attachment of building materials to foam in such a manner is provided by my prior U.S. Pat. No. 5,661,929, whose adaptation to the present invention in light of the present disclosure would be appreciated by those of ordinary skill in the art.

FIG. 2 illustrates the base 400 having a top 400T, bottom 400B, a front 400F, and a rear 400R, substantially extending between all of which is solid foam, except for a top recess 402, flush with the rear 400R, sized and shaped for closely accommodating the firebox bottom 500B. The top recess 402 has an upper surface 402U which is parallel to and below the base top 400T. In particular, the top recess 402 has a depth such that when the firebox 500 is inserted downward therein with the firebox bottom 500B resting against the top recess upper surface 402U, the fire cavity bottom 504B is at substantially the same height as the top 400T of the base 400. Thus, the fire cavity bottom 504B is located somewhat above the firebox bottom 500B. Further illustrated in FIG. 2, the base top 400T should have fire resistant board 510 extending horizontally thereon, and mounted at the base top 400T using the metal inserts 512 extending within the base 400 parallel and immediately adjacent to the base top 400T. In particular, the metal inserts 512 extend within the foam in the base 400, near and parallel to the base top 400T, at least partially submerged therein, extend between the base front 400F and the top recess 402 and said fire resistant board 510 is fastened to said metal inserts 512. The fire resistant board 510 upon the base top 400T should extend at least immediately in front of the fire cavity 504, so as to protect the foam of the base from heat emanating from the fire cavity 504 at the mantle opening 502. In addition, the base 400 can be configured to provide an additional recess for accommodating such fire resistant board 510 extending on the base top 400T while maintaining a substantially flat horizontal surface on the base 400 around the firebox 500 as indicated by FIG. 1 and FIG. 4.

FIG. 1 provides an outward view of the chimney housing 600, such that it is apparent that the chimney housing 600 has a bottom 600B, a top 600T, a flue 601 having a flue cap 604, extending upward from the chimney housing top 600T, and sides which may taper outward while extending downward from the top 600T and overhang the firebox 500 in an aesthetically pleasing manner. Innumerable configurations and aesthetic designs are possible.

Figure 3:
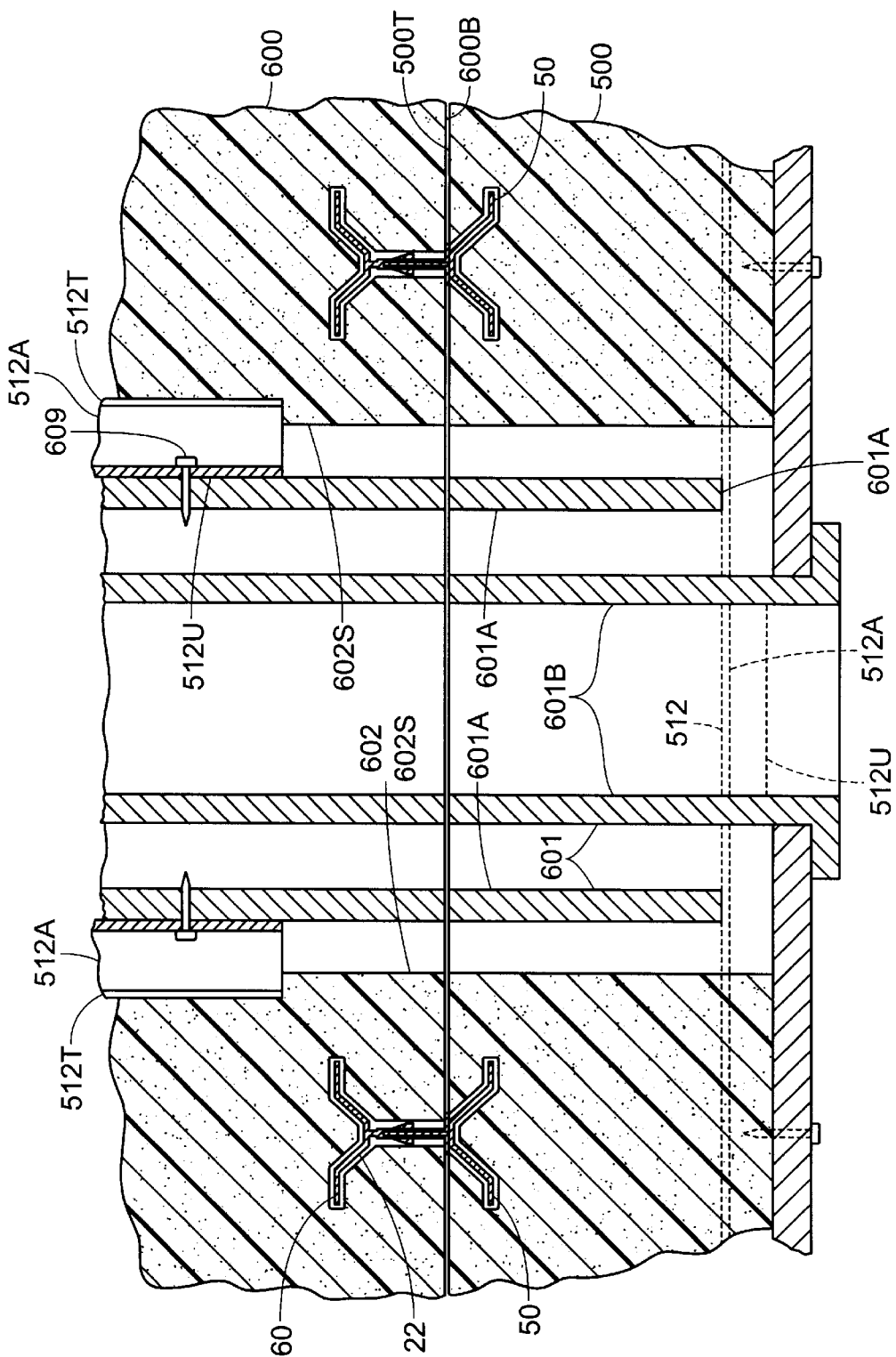
FIG. 3 is an enlarged view, detailing interconnection of the chimney and firebox using a connector set.

Structural details of the chimney housing 600, however, are best viewed with reference to FIGS. 2, 3, and 4. In particular, the chimney housing 600 is also substantially a block of solid foam; however having a central bore 602 extending fully between the chimney housing top 600T and chimney housing bottom 600B. The central bore 602 has a central bore surface 602S. The flue 601 extends through the central bore 602 and is in communication with the fire cavity 504 near the chimney housing bottom 600B.

As hot gases rising from the fire cavity would be unsuitable to directly contact the foam of the central bore surface 602S, the present invention protects the central bore surface 602S from direct exposure to such intense heat. In particular, the flue 601 comprises two concentric tubes, namely an outer tube 601A and an inner tube 601B. The inner tube 601B is in direct gaseous communication with the fire cavity 504, and conduits such gases upward to the flue cap 604 where they are vented to outside the fireplace 18.

The outer tube 601A is attached within the central bore 602 by the metal inserts 512 which extend within the foam surrounding the central bore 602. In contrast to the manner of attachment of the fire resistant board 510 in both the firebox 500 and the base 400, part of the anchoring portion 512A of the metal inserts 512 preferably protrude into the central bore 602, such that the metal insert upper surface 512U is not submerged below (radially outward) from the central bore surface 602S, but extends above (radially inward) from the central bore surface 602S, and the outer tube 601A is attached to the metal insert upper surface 512U with flue fasteners 609, which may be screws, bolts, or the like. In this way, the metal inserts 512 act to minimize contact between the outer tube 601A and the foam present at the central bore surface 602S and beyond. Alternatively, the flue fasteners 609 can themselves act as spacers, such that they can be structured to rigidly secure to the outer tube 601A, and rigidly secure to the metal insert upper surface 512U even when at or below the central bore surface 602S, while still maintaining the outer tube 601A a predetermined desired distance from the central bore surface 602S.

In further detail, in conformity with the present invention, part of anchoring portion 512A of the metal inserts 512 must remain submerged beneath the central bore surface 602S (radially outward therefrom). In particular, the anchoring portions 512 generally comprise a pair of flanges 512T which remain submerged within the foam and extend substantially parallel to the central bore surface 602S (or substantially tangential to the central bore surface in the case of the circular bore illustrated).

In addition, at least two or more metal inserts are employed to attach the outer tube 601A of the flue 601 to the chimney housing 600. FIG. 3 implies that three or four metal inserts 512, each extending vertically parallel to the central bore 602 are employed not only to rigidly fasten the flue 601 to the chimney housing 600, but to center the outer tube 601A within the central bore 602 and space the flue 601 from the central bore 602 to impede the flow of heat from the hot gases escaping through the inner tube 601B to the foam at the central bore 602.

Advantageously, an air space extends between the inner tube 601B and outer tube 601A, further insulating the foam within the chimney housing 600 from intense heat rising from the fire cavity 504 and vented through the inner tube 601B. The air space can be configured so as to promote a current of air which cools the inner tube 601B and prevents heat from reaching the outer tube 601A and thereby reaching the foam of the chimney housing 600.

For example, as illustrated in FIG. 2, heated air between the inner tube 601B and outer tube 601A will naturally rise, and is permitted to escape beneath the flue cap 604. To facilitate such air flow, a space, conduit, vent, or the like can be provided near the bottom of the outer tube 601A of the flue 601, as seen in FIG. 3, to allow air to enter the air space between the inner tube 601B and outer tube 601A. Note that the horizontal hidden line representation of one of the metal inserts 512 is actually behind the central bore 602. Accordingly, cool air will be sucked downward through the central bore 602 by the rising heated air between the inner tube 601B and outer tube 601A. In this way, cool air will always flow in the central bore 602 and further prevent heat from reaching the foam of the chimney housing 600.

Further illustrated in FIGS. 2 and 3, the chimney bottom housing 600B is mounted upon the firebox top 500T. Considering that the inner tube 601B must be in communication with the fire cavity 504, provision must be made for continuing the inner tube 601B across the interface of the chimney housing bottom 600B and firebox top 500T. In the embodiment shown, the flue 601 is partially within both the firebox 500 and chimney housing 600, such that both upper and lower portions of the flue 601 abut each other when the firebox top 500T and chimney housing bottom 600B are brought together. In reality the connection of the portions of the flue can be slightly more complicated—using a joint wherein the tubes 601A, 601B are slightly larger than the tubes 601A, 601B in the upper portion. However, the interconnection of such tubes could be accomplished in numerous ways by those skilled in the art. As such, a detailed discussion of the same is beyond the scope of the present discussion.

Now that the modules 300, namely the base 400, firebox 500, and chimney housing 600 have been discussed in detail, their potential for on-site attachment will be discussed in detail hereinbelow.

As previously stated, the modules may be attached 'in the field' or 'on site' of installation using connector sets, a portion of each connector set being first attached within the modules at their surfaces to be joined.

In general, the connector set includes a first connector, a second connector, and a mechanism for securing the first connector and second connector. The first connector and second connector are each anchored within one of the foam modules: close to and parallel to its surface which will be joined with the surface of another module. The first and second connectors have at least one laterally extending flange which anchors that connector within the foam, and prevents it from 'pulling out' when a force normal to the surface is exerted. Following this concept, several embodiments of the connector set and its use are illustrated herein, and then its specific use in connecting the modules of the fireplace are illustrated. Substantially three embodiments are discussed below which are suitable for the purposes of the present invention. Following this discussion, the two preferred embodiments of the connector set for use with the fireplace and their application regarding the same is discussed.

Figure 5:
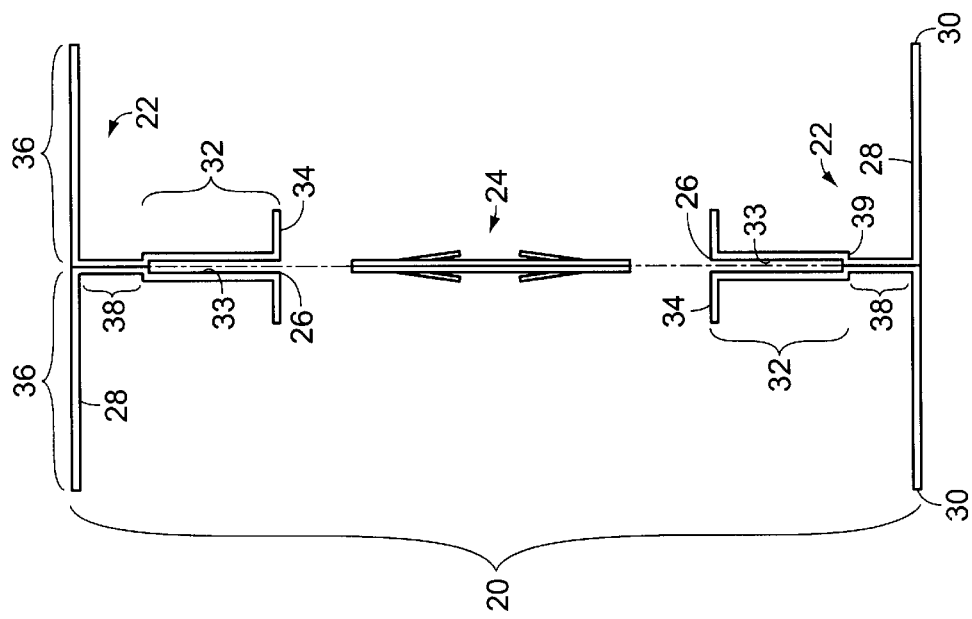
FIG. 5 is an exploded side elevational view, illustrating components of a connector set which may be used to join the foam modules of the invention, employing a pair of female connection devices and a lance.

FIG. 5 illustrates an embodiment of a connector set 20. The connector set 20 includes a pair of female connection devices 22 and a lance 24. The female connection devices 22 have an open end 26 and a flange 28 fully opposite from the open end 26. Each female connection device 22 is preferably made from a pair of symmetrical plates 30 of sheet metal, which are bent and attached together by spot welding or the like.

In particular, each plate 30 has an open part 32, where the plates extend substantially parallel and are spaced slightly apart; a surface bend 34 at the open end 26 where each of the plates extend substantially perpendicular to its associated open part 32 and the two plates extend fully away from each other; a flange half 36 where the plates are bent to extend parallel to yet away from each other; and an attachment part 38 which extends substantially parallel to the open part 32, between the open part 32 and flange half 36. The attachment parts 38 of the two plates 30 extend parallel, against each other, and are fastened together. Transitional parts 39 are inward bends which transition the plates 30 between being spaced slightly apart at the open parts 32, and being abutted against each other at the attachment parts 38.

Accordingly, the female connection device 22 is formed to create a slot 33, beginning at the open end 26, and extending substantially to the attachment parts 38. More particularly, the slot terminates at the transitional parts 39.

It should be clear that the female connection devices 22 are shown in a way which illustrates its consistent cross-section along its length. Accordingly, other than being fabricated from two plates 30 as illustrated, the female connection device 22 can be extruded and would thereby be formed of one piece of material. Depending on the application, that material can be various metals, or even plastic.

Figure 6:
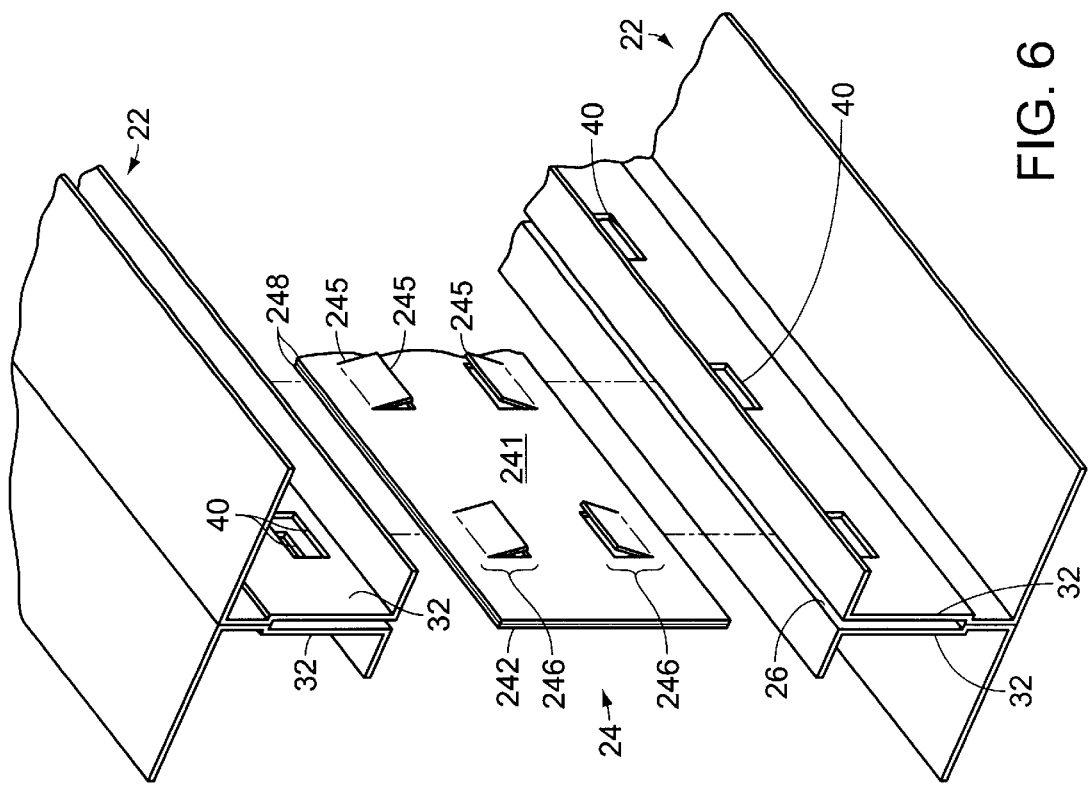
FIG. 6 is a diagrammatic perspective view, with parts broken away, illustrating components of the first embodiment of the connector set.

Referring to FIG. 6, a plurality of catch openings 40 are longitudinally spaced along each of the open parts 32 on each of the female connection devices 22, and are generally located at the same position on each of the complimentary open parts 32. The purpose of the catch openings 40 will be apparent immediately hereinafter.

Referring to both FIG. 5 and FIG. 6, the lance 24 is provided to facilitate connection of two female connection devices 22. In particular, the lance 24 is substantially flat, and has a first broad side 241 and a second broad side 242. The lance 24 has catches 245, longitudinally spaced at corresponding positions on both the first broad side 241 and second broad side 242. The longitudinal spacing of the catches 245 corresponds exactly to the spacing of the catch openings 40 on the open parts 32 of the female connection device 22. Accordingly then, the lance 24 is intended for insertion into the open end 26 of each female connection device 22 so that the catches 245 align with and engage the catch openings 40.

More particularly, the catches 245 are arranged in a pair of parallel rows 246 on each of the first broad side 241 and second broad side 242. Thus, to facilitate attachment of the two female connection devices 22, the lance 24 is inserted into the open end 26 of each of the female connection devices 22, and one of the rows 246 on each of the broad sides 241, 242 engages the catch openings 40 on one of the female connection devices 22, while the other rows 246 engage the catch openings 40 on the other of the female connection devices 22. Accordingly, the lance 24 connects the female connection devices.

The lance 24 is preferably made from a pair of laminated sheets 248 of metal, such that the first broad side 241 is located on one of the sheets 248 of metal, and the second broad side 242 is located on the other sheet 248 of metal. The sheets 248 are stamped, prior to their lamination, to create the catches 245, such that the catches 245 protrude from the broad sides 241, 242, and on each of said sides, the catches 245 of each of the rows 246 are inclined toward the catches of the other row 246. The catches 245 each have a free edge 247 which faces one of the catches 245 in the adjacent row 246. The rows on each broad side 241, 242 extend substantially parallel to each other.

Figure 7:
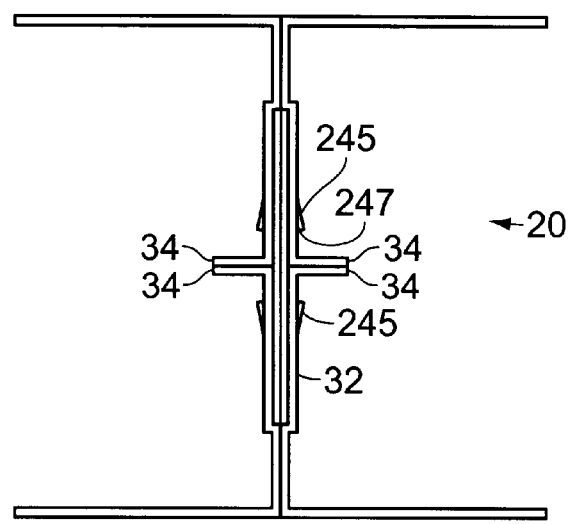
FIG. 7 is a side elevational view, wherein the female connection devices have been joined with the lance.
Figure 8:
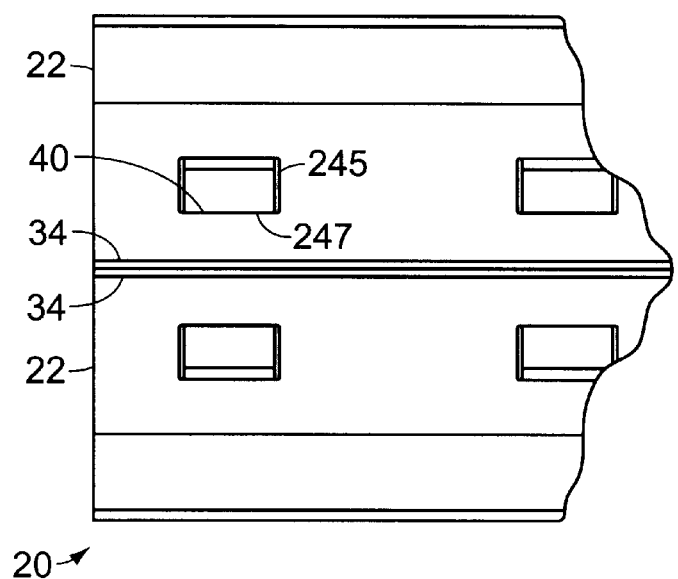
FIG. 8 is a front elevational view thereof, with a portion broken away which illustrates that the connection device is of arbitrary length.

The rows of catches 245 are of course spaced apart from each other so that they can each engage the catch openings 40 of one of the female connection devices 22, such that when female connection devices 22 are thus mated as in FIG. 7, the surface bends 34 of the two female connection devices 22 substantially abut each other. As seen in FIG. 8, the catches 245 are inclined such that the free edge 247 engages the catch openings 40 to prevent the female connection devices 22 from being pulled apart. Note that the extent of inclination of the catches 245 might be exaggerated slightly in the drawing figures for illustrative purposes when viewing the connector set 20 in side elevation. The catches 245 need not actually protrude beyond the broad sides 241, and 242, but simply get 'caught' on the edges of the catch openings 40—depending on the thickness of material employed for the open parts 32.

In the embodiment described thus far, the connector set 20 includes two female connection devices 22 and a lance 24. FIG. 5 illustrates this connector set 20 being used to join two foam modules 300, each foam module having a surface 302. Each of the female connection devices 22 is partially or fully submerged beneath the surface 302 of one of the foam modules 300, and extends within a channel 304 extending through that module 300, parallel to and near its surface 302. In general, the channel 304 is elongated, having a length to accommodate the female connection device 22 and has a uniform cross sectional shape which mimics the overall cross sectional profile of the female connection device. Accordingly, the female connection device 22 is easily slid longitudinally into the channel 304, where it fits snugly. The flange halves 36 of the female connection devices 22 extend laterally to anchor the female connection device within the block of foam and prevent the connection device 22 from 'pulling out' of the module 300.

Figure 9:
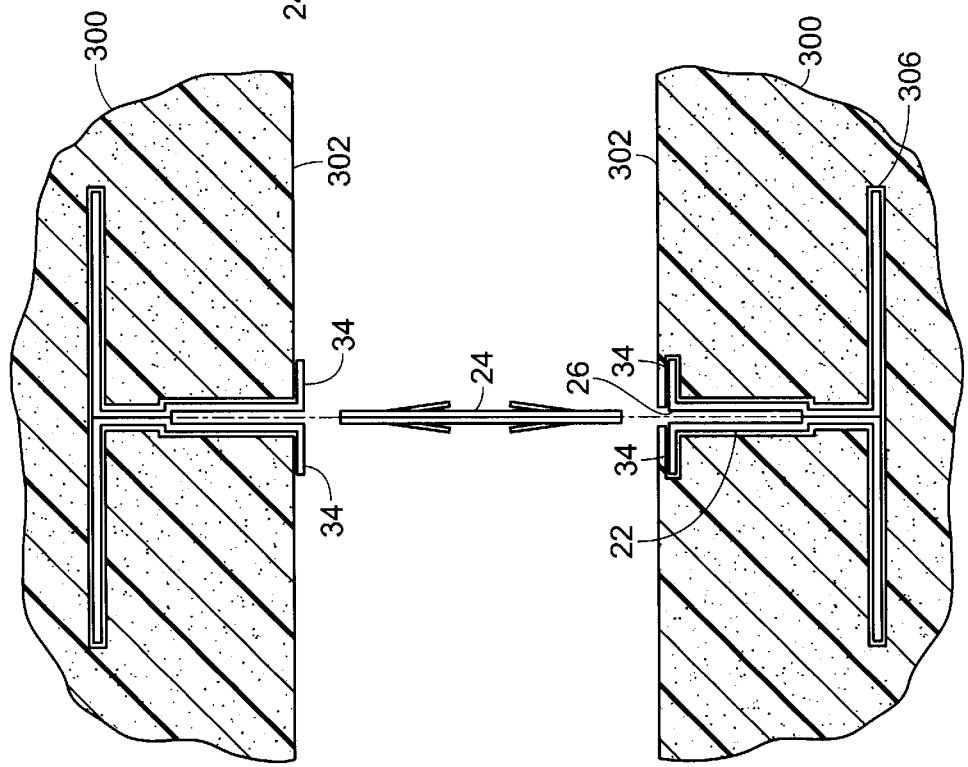
FIG. 9 is an exploded view, similar to FIG. 5, except wherein the female connection devices are each embedded within a block of foam and have an open end which is exposed at the surface of that block of foam.

FIG. 9 further illustrates how the surface bends 34 can be submerged beneath the surface 302 by shaping the channel 304 to accommodate the surface bends 34, or can have the surface bends 34 extending directly against the surface 302 of the module 300. Both of these configurations, illustrated in FIG. 5 function equally well. Submerging the surface bends 34 beneath the surface 302 of the module 300 serves an additional aesthetic function, in applications where it is not certain that any attachment will be made to the female connection device 22. Accordingly, the female connection will remain concealed within the module 300 until it is needed to allow another block to be attached thereto, the surface 302 of the block may itself be made continuous across the open end 26 of the female connection device 22. When desired to make a connection, the surface 302 may be opened to expose the open end 26 of the female connection device 22—even using the lance 24!

Figure 10:
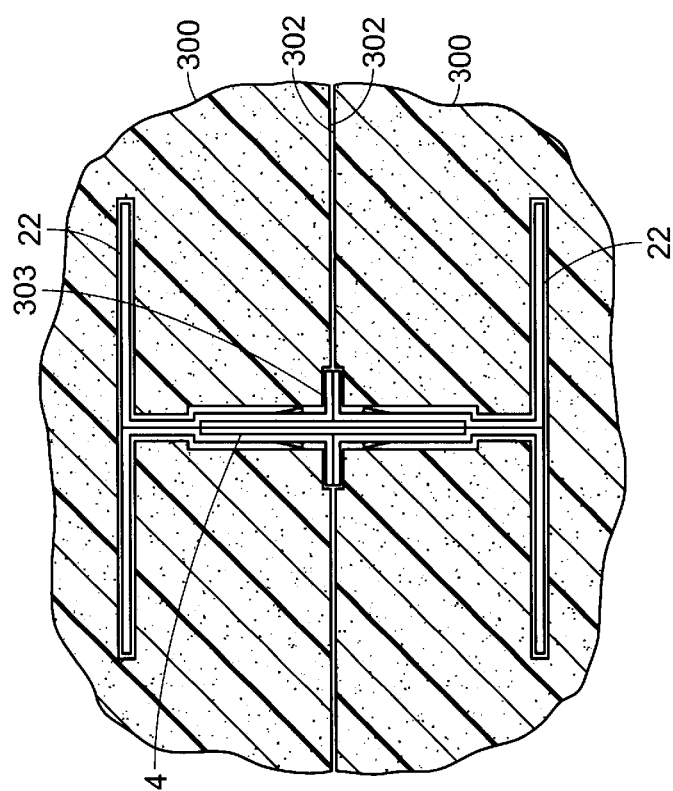
FIG. 10 is a side elevational view, illustrating the foam modules joined together by attaching the lance within each of the open ends of the female connection devices.

FIG. 10 illustrates two modules 300 joined together, such that their surfaces 302 substantially abut each other. The lance 24 holds the female connection devices 22 together, which are themselves securely anchored within the, modules 300. Thus, the lance 24 holds the modules 300 together.

In FIG. 10, the channels 306 have been configured so that the surfaces 302 of the modules 300 each have surface recesses 303 which accommodate the surface bends 34 of the female connection devices 22, so that they are outwardly flush with the surface 302 of their associated module 300. This configuration allows the surfaces 302 to most closely abut each other once the modules 300 are connected with the lance 24.

Figure 11:
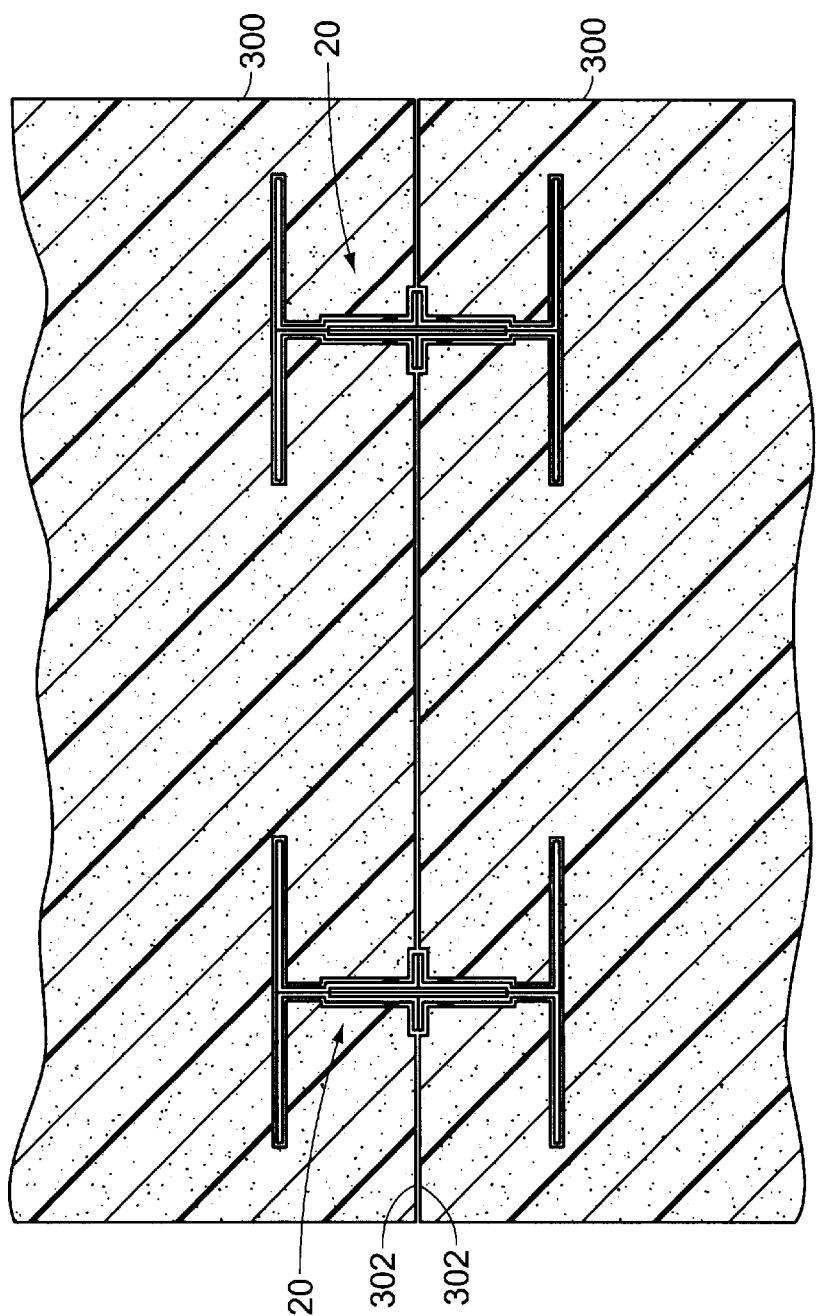
FIG. 11 is a side elevational view, illustrating the modules joined together using more than one connector set to more securely join the same pair of surfaces.

FIG. 11 illustrates a pair of connector sets 20 being used to join together two surfaces 302 of two modules 300. Each of the connector sets 20 extends longitudinally through the blocks, and 'into the drawing sheet'. The connector sets 20 may be spaced and positioned as needed to provide the requisite structural strength for the joinder of the modules 300—according to the application. It should be noted that although the drawing figures illustrate the blocks being 'broken away', FIGS. 9 through 15 could easily also be end views. In general, the connector sets have consistent cross-sectional profiles. Further, anchoring the connectors within the blocks of foam 300 involves cutting a channel in the foam, which requires an open end in a plane perpendicular to the surface 302. Accordingly, these views also illustrate the system, as it would be seen from the open end.

The first embodiment of the connector set 20 illustrated in FIGS. 5 through 11 allows effective connection of two foam modules 300, and provides the essential structural principles and features upon which the following two embodiments are based. The first embodiment's advantage lies in its ability to be concealed within a module until needed. However, the following two embodiments are perhaps better suited for the purposes of connecting the fireplace modules 400, 500, and 600, since they would seem to have superior strength, and the goal of providing an aesthetically pleasing appearance is less important—since the connectors will be concealed once the fireplace installation is complete.

Figures 12, 13:
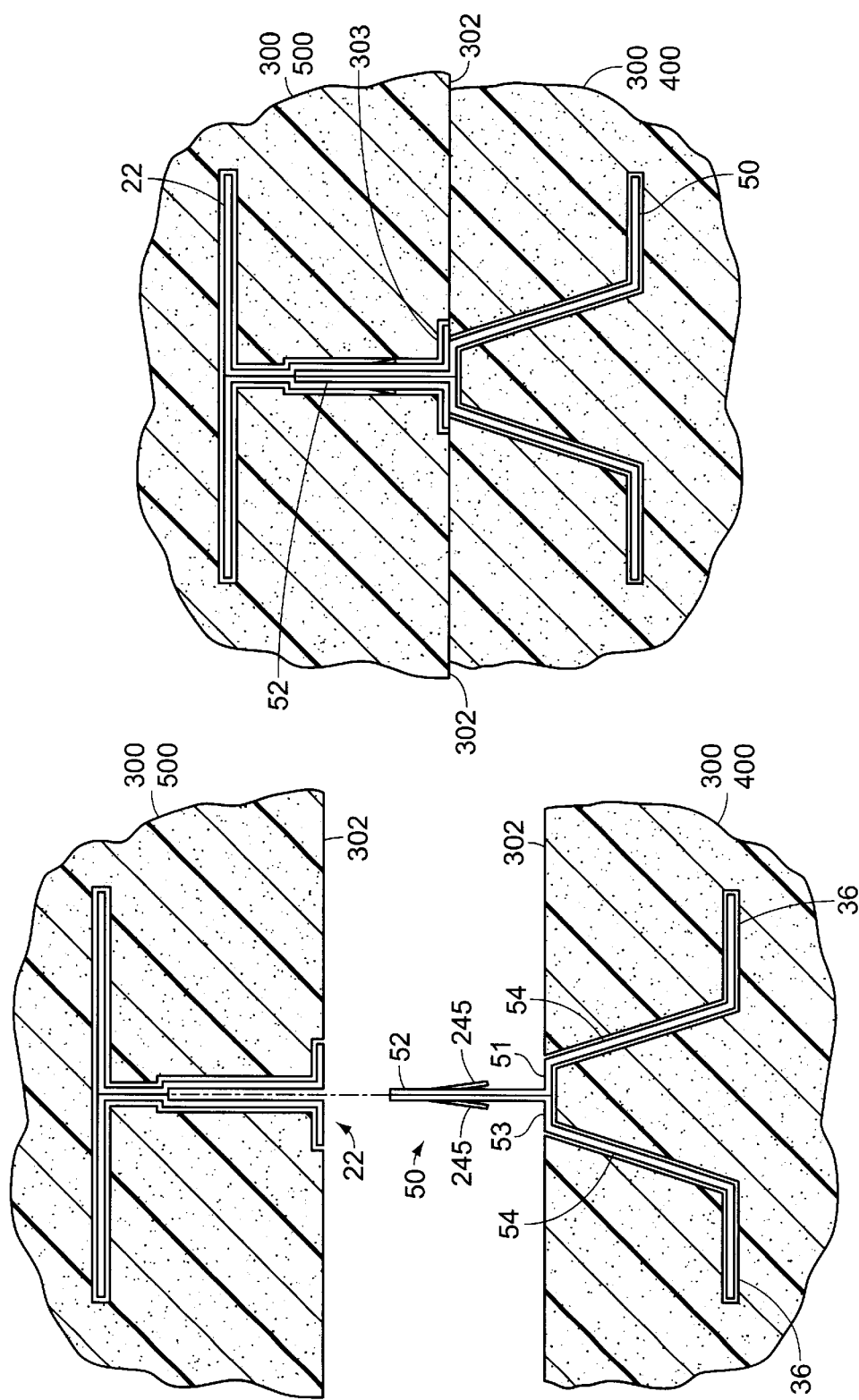
FIG. 12 is a side elevational view, illustrating an additional embodiment of the connector set, which is used to join the base and firebox, wherein a male connection device is employed.
FIG. 13 is a side elevational view, illustrating the additional embodiment in use, wherein the male connection device is partially embedded within the base, and the male projection of the male connection device is locked within the open end of the female connection device within the firebox to join the base and firebox.

FIG. 12 illustrates an additional embodiment of the invention, wherein one of the female connection devices 22 is attached within one of the foam modules 300, such as the firebox 500, with its open end 26 exposed at the surface 302 of that foam module. A male connection device 50 is also in use; the male connection device 50 is partially submerged within another of the foam modules 300. The male connection device 50 has a male projection 52 which extends above the surface 302 of its foam module 300 (outside of the foam module), and is similar in configuration to the lance 24, wherein the male projection 52 is configured for insertion into the open end 26 and has catches 245 which are longitudinally spaced in two rows on opposite sides of the male projection 52, for engaging the catch openings 40 in the female connection device 22.

In general, the male connection device 50 has an anchoring base 51 which is mostly submerged within the foam to secure the male connection device 50 within its foam module 300, such as the base 400 or firebox 500, and has the male projection 52 which facilitates attachment to the female connection device 22. The anchoring base 51 includes the flange, which is hereto comprised of the flange halves 36, an anchor top 53 two which the male projection 52 is attached, and diagonal portions 54 which connect the anchor top 53 and flange halves 36 while enhancing the surface area which contacts the foam module 300.

FIG. 13 illustrates the connection of the foam modules 300, namely the base 400 and firebox 500, by inserting the male projection 52 into the open end 26 of the female connection device 22, and engaging the catch openings 40 on the female connection device 22 with the catches 245 of the male projection 52 (as suggested by FIG. 12). Accordingly, the base 400 and firebox 500 are held together. In this embodiment, the channels include surface recesses 303 to accommodate both the anchor top 53 of the male connection device 50 on one module 300 and the surface bends 34 of the female connection device 22, which truly allow the surfaces 302 to abut each other.

Figure 14:
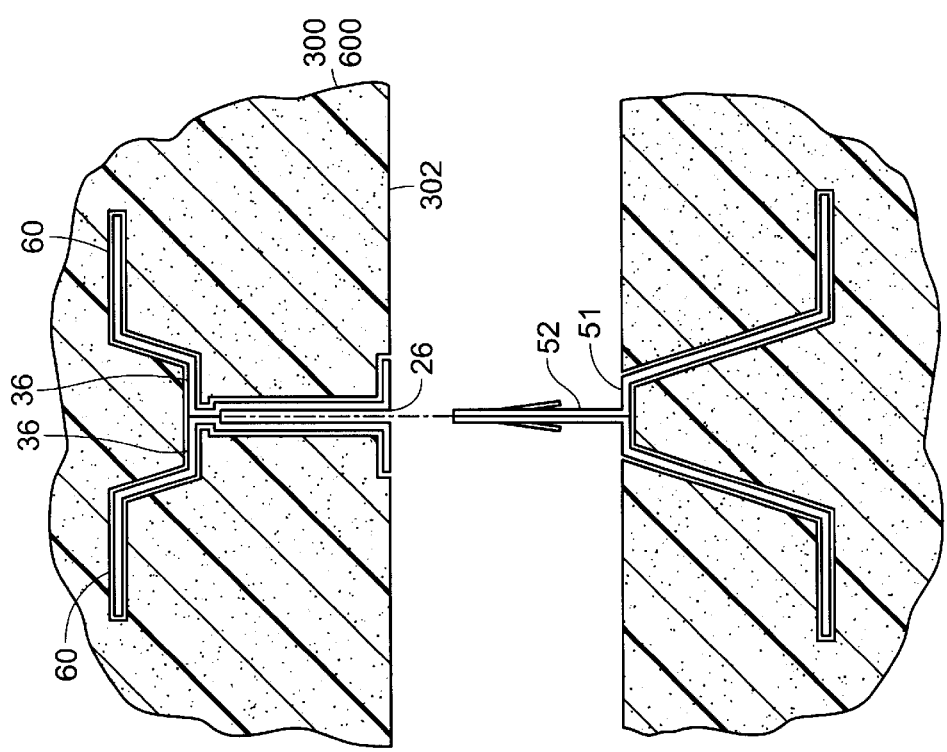
FIG. 14 is a side elevational view, illustrating a further embodiment of the connector set, wherein the female connection device has a 'dutch hat' configuration for increased anchoring strength within the chimney housing.

FIG. 14 illustrates a further embodiment of the connector set, wherein the female connection device 22 has a pair of supplementary anchors 60 attached to the flange halves 36, extending further away from the open end 26 and thus the surface 302 of the foam 300, and laterally outward from the flange halves. The supplementary anchors have a 'dutch hat' configuration' which increases the surface area that the female connection device 22 contacts within the foam module 300, namely the chimney housing 600, and thereby provides enhanced integrity and superior anchoring within the foam module, which helps resist 'side loading' perpendicular to the axis of connection.

Figure 15:
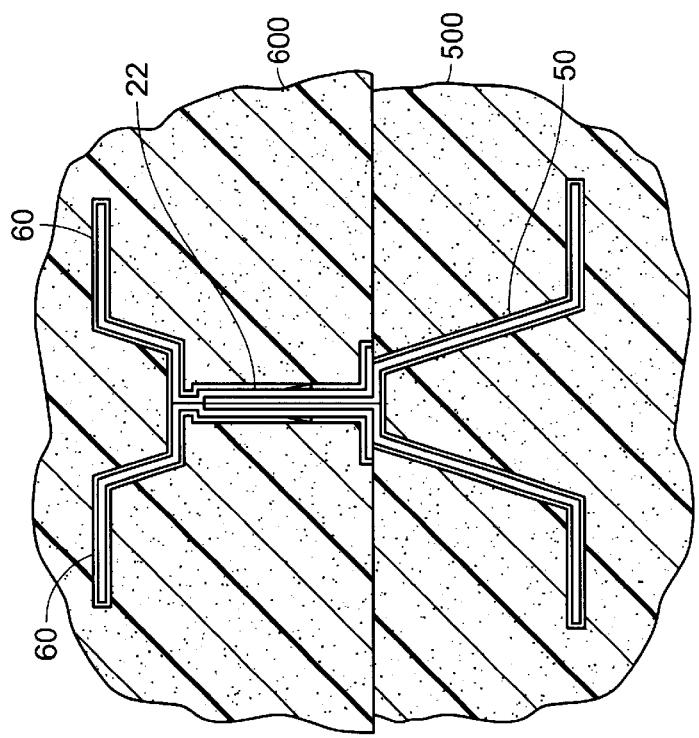
FIG. 15 is a side elevational view, illustrating the male connection device engaged with the further embodiment of the female connection device, providing a joint between the firebox and chimney housing having significant tensile strength and resistant of lateral forces.

FIG. 15 illustrates the female connection device 22 having the supplementary anchors 60 fastened to the male connection device 50 to hold the foam modules 300—namely the chimney housing 600 and firebox 500 together. However, the female connection device 22 having the supplementary anchors 60 can also be used with the lance 24, to connect to another female connection device 22 with or without the supplementary anchors 60.

Now then, the embodiment of the connector sets 20 shown in FIGS. 12 and 13, and the embodiment shown in FIGS. 14 and 15 are used to join the fireplace base 400 and firebox 500, and join the firebox and chimney housing 600, respectively. In particular, as seen in FIG. 2, the female connection devices 22 are mounted within the firebox 500 at the firebox bottom 500B and within the chimney housing 600 at the chimney housing bottom 600B, with their open ends 26 oriented downward and substantially flush with the firebox bottom 500B and chimney housing bottom 600B, respectively. The male connection devices 50 are mounted within the base 400 at the top recess upper surface 402U, and within the firebox 500 at the firebox top 500T, such that the anchoring portion 51 is submerged within the base 400 and firebox 500, and the male projection 52 extends upward from the top recess upper surface 402U and the firebox top 500T.

Accordingly, following the principles of these connectors as discussed above, assembling the fireplace 18 involves simply bringing the firebox 500 downward into the top recess 402 of the base, to mate the male connection device 50 extending upward from the base within the top recess 402 with the female connection device 22 within the firebox, such that the firebox bottom 500B rests substantially flush against the top recess upper surface 402U and the firebox 400 is thereby firmly attached to the base, as seen in FIG. 3.

In addition, the chimney housing 600 is brought downward upon the firebox 500, to mate the male connection device 50 extending upward from the firebox 500 with the female connection device 22 within the chimney housing 600, such that the chimney housing bottom 600B rests substantially flush against the firebox top 500T and thee firebox 500 is thereby firmly attached to the base 400. As previously discussed, additional steps may be necessary to attach upper and lower portion of the flue 601.

It should be further noted that the female connection device 22 employed and installed in the chimney housing 600 is of the 'third embodiment' (as illustrated in FIGS. 14 and 15), such that they include the supplementary anchors 60. This embodiment is used to help resist possible side loading against the chimney housing. Resistance to such side loading against the firebox 500 is provided by the positioning of the firebox within the upper recess 402 of the base 400. However, the 'stacking' of the chimney housing 600 upon the firebox 500 makes it more susceptible to lateral stresses—particularly in an outdoor installation where it may be subjected to heavy winds.

The connection of the base 400, 500, and 600 using the connector sets 20 allows them to be fabricated separately, and finished using a variety of finishing techniques—including stucco, simulated and even actual stone and brick veneer, etc.—in a manufacturing environment where such finishes may be applied inexpensively. The modules 400, 500, and 600 may be subsequently shipped to the site of installation, where they are easily joined using the connector sets 20. Accordingly, the expense both of fabricating the fireplace, and in applying a finish to the fireplace is minimized. Further, the use of foam increases the possibility of the inexpensive fabrication of custom shapes. For example, a 'curved' fireplace may be constructed using foam at virtually no additional expense compared to a rectangular on, where such a feature would drastically increase the expense of a fireplace which is built on site using conventional building techniques.

In conclusion, herein is presented a system for providing a fireplace which is constructed primarily of foam, wherein the foam is protected from direct exposure to heat, and allows the fireplace to be fabricated in modules which may be subsequently permanently joined at the site of installation using connector sets disclosed herein. The invention is illustrated by example in the attached drawings figures and in the foregoing description. Numerous variations are possible, however, while adhering to the inventive concept. Such variations are contemplated as being a part of the present invention.

What is claimed is:

1. A fireplace, comprising:
   a firebox, the firebox constructed substantially of a solid block of foam, the firebox having a top, a bottom, a front, the front having a mantel opening, the firebox further having a fire cavity representing a void extending into the firebox from the front, providing a region for the burning of fuel, the fire cavity defined by the mantel opening and sides, the sides including firebox lateral sides, a firebox top, a firebox bottom, and wherein fire resistant boards line the sides of the firebox to protect the foam of the firebox from direct exposure to heat;
   a chimney housing, the chimney housing substantially made of a solid block of foam, the chimney housing having a top and a bottom, the chimney housing bottom attached on the firebox top, the chimney housing having a flue extending between the chimney housing bottom and chimney housing top, the flue in communication with the firebox for venting heat from the firebox.

2. The fireplace as recited in claim 1, wherein the chimney housing has a central bore extending fully from the chimney housing top to chimney housing bottom, the central bore having a central bore surface, the flue extends concentrically within the chimney housing but is spaced from the central bore surface.

3. The fireplace as recited in claim 2, wherein the firebox further comprises
   channels extending within the foam of the firebox, the channels extending parallel to and immediately adjacent to the sides of the fire cavity;
   inserts extending snuggly within the channels; and
   fastening devices which secure the fire resistant boards to the sides of the fire cavity by securing the fire resistant boards to the inserts.

4. The fireplace as recited in claim 3, wherein the flue comprises an inner tube and an outer tube, the inner tube extends concentrically within the outer tube and is in communication with the fire cavity, the outer tube is attached at the central bore surface, and an air space extends between the outer tube and inner tube, for allowing an air current to flow between the outer tube and inner tube to inhibit heat from the inner tube from reaching the outer tube and thereby inhibit heat from reaching the foam of the chimney housing at the central bore surface.

5. The fireplace as recited in claim 4, wherein the outer tube is attached at the central bore surface with inserts that extend partially within the foam beneath the central bore surface and anchor within the foam, and with fasteners which connect said inserts to the outer tube.

6. The fireplace as recited in claim 5, wherein the inserts within the chimney housing extend vertically, parallel to the central bore surface.

7. The fireplace as recited in claim 6, further comprising a base, the base substantially a block of foam, having a top, a bottom, a front, and a rear, base having a top recess extending downward from the top adjacent to the base rear, the top recess sized to accommodate the firebox, such that the firebox extends downward into the base and is supported thereby.

8. The fireplace as recited in claim 7, wherein the top recess has an upper surface and a depth between the upper surface and the base top, wherein the firebox bottom is located a distance below the fire cavity bottom a distance substantially equal to the depth of the top recess of the base so that when the firebox is lowered into the top recess of the base the base top is substantially flush with the fire cavity bottom.

9. The fireplace as recited in claim 8, wherein the firebox and chimney are each independent modules, which are selectively connected by at least one connector set, wherein each of said connector sets includes one connection device which is at least partially submerged and anchored within the foam at the firebox top, and includes another connection device which is at least partially submerged and anchored within the foam at the chimney housing bottom, such that the chimney housing is affixed to the firebox by mating the connectors of each of said connector sets.

10. The fireplace as recited in claim 9, wherein the firebox is selectively connected to the base by at least one connector set, wherein each of said connector sets includes one connection device which is at least partially submerged and anchored within the foam at the top recess upper surface, and includes another connection device which is at least partially submerged and anchored within the foam at the firebox bottom, such that the firebox is mated with the base by mating the connectors of each of said connector sets.

11. A fireplace, comprising:
   a firebox, the firebox constructed substantially of a solid block of foam, the firebox having a top, a bottom, a front, the front having a mantel opening, the firebox further having a fire cavity representing a void extending into the firebox from the front, providing a region for the burning of fuel;
   a chimney housing, the chimney housing substantially made of a solid block of foam, the chimney housing having a top and a bottom, the chimney housing having a flue extending between the chimney housing bottom and chimney housing top, the flue in communication with the firebox for venting heat from the firebox; and
   at least one connector set, each connector set including a pair of connection devices, each connection device having at least one laterally extending flange, one of said connection devices at least partially submerged within the foam at the chimney housing bottom such that said connection device and its laterally extending flange extends substantially parallel to the chimney housing bottom with said laterally extending flange submerged within the foam, the other of said connection devices at least partially submerged within the foam at the firebox top such that said connection device and its laterally extending flange extends substantially parallel to the firebox top with said laterally extending flange submerged within the foam, such that the connection devices of each of said connector sets is mateable to affix the chimney housing to the firebox top.

12. The fireplace as recited in claim 11, further comprising a base, the base substantially a block of foam, having a top, a bottom, a front, and a rear, base having a top recess extending downward from the top adjacent to the base rear, the top recess having an upper surface and sized to accommodate the firebox, such that the firebox extends downward into the base and is supported thereby, and further comprising a connector set for affixing the firebox to the base wherein said connector set includes on connection device at least partially submerged within the top recess upper surface, and another connection device at least partially submerged within the firebox bottom, such that said connector set is mateable to affix the base and firebox.

13. The fireplace as recited in claim 12, wherein the fire cavity is defined by the mantel opening and sides, the sides including firebox lateral sides, a firebox top, a firebox bottom, and wherein fire resistant boards line the sides of the firebox to protect the foam of the firebox from direct exposure to heat.

14. The fireplace as recited in claim 13, wherein the firebox further comprises
   channels extending within the foam of the firebox, the channels extending parallel to and immediately adjacent to the sides of the fire cavity;
   inserts extending snuggly within the channels; and
   fastening devices which secure the fire resistant boards to the sides of the fire cavity by securing the fire resistant boards to the inserts.

15. The fireplace as recited in claim 14, wherein the chimney housing has a central bore extending fully from the chimney housing top to chimney housing bottom, the central bore having a central bore surface, the flue extends concentrically within the chimney housing but is spaced from the central bore surface, the flue having an inner tube and an outer tube, the inner tube extends concentrically within the outer tube and is in communication with the fire cavity, the outer tube is attached at the central bore surface, and an air space extends between the outer tube and inner tube, for allowing an air current to flow between the outer tube and inner tube to inhibit heat from the inner tube from reaching the outer tube and thereby inhibit heat from reaching the foam of the chimney housing at the central bore surface.

16. The fireplace as recited in claim 15, wherein the outer tube is attached at the central bore surface with inserts that extend vertically, parallel to and at least partially within the foam beneath the central bore surface and anchor within the foam, and with fasteners which connect said inserts to the outer tube.

17. A system for creating a fireplace from two modules, each module made substantially of a block of foam, including a firebox and a chimney housing, the firebox having a top, a bottom, a front, and a fire cavity exposed through a mantel opening at the front, the chimney housing having a top, a bottom, and a flue extending vertically therebetween, using connector sets, each connector set including a first connector and a second connector, each having a laterally extending flange, comprising the steps of:
   anchoring the first connector within the foam at the firebox top, the first connector extending longitudinally near and parallel to the firebox top, the first connector flange extending substantially parallel to the firebox top;

anchoring the second connector within the foam at the chimney housing bottom, the second connector extending longitudinally near and parallel to the chimney housing bottom, the first connector flange extending substantially parallel to the firebox top; and securing the firebox and chimney together while substantially abutting the firebox top and chimney housing bottom by securing the first connector to the second connector.

18. The method for creating a fireplace as recited in claim 17, wherein the first connector is a female connection device, having an open end, a pair of parallel open parts which have catch openings spaced longitudinally therealong, wherein the second connector is a male connector having a male projection protruding from the firebox top and having an anchoring portion submerged beneath the firebox top, and wherein the step of securing the firebox and chimney housing together further comprises:

inserting the male projection into the open end of the female connection.

19. The method for joining the two blocks of foam as recited in claim 12, wherein:

the first and second connectors are elongated, each having substantially uniform cross sectional shapes;

the steps as recited are preceded by the steps of cutting a channel in the chimney housing parallel to the chimney housing bottom to accommodate the cross sectional shape of the female connector, and cutting a channel in the firebox parallel to the firebox top to accommodate the cross sectional shape; and the steps of anchoring the connectors within the chimney housing and firebox further comprises sliding the first and second connector longitudinally into the channel in the chimney housing and firebox, respectively.

* * * * *